Patented July 26, 1932

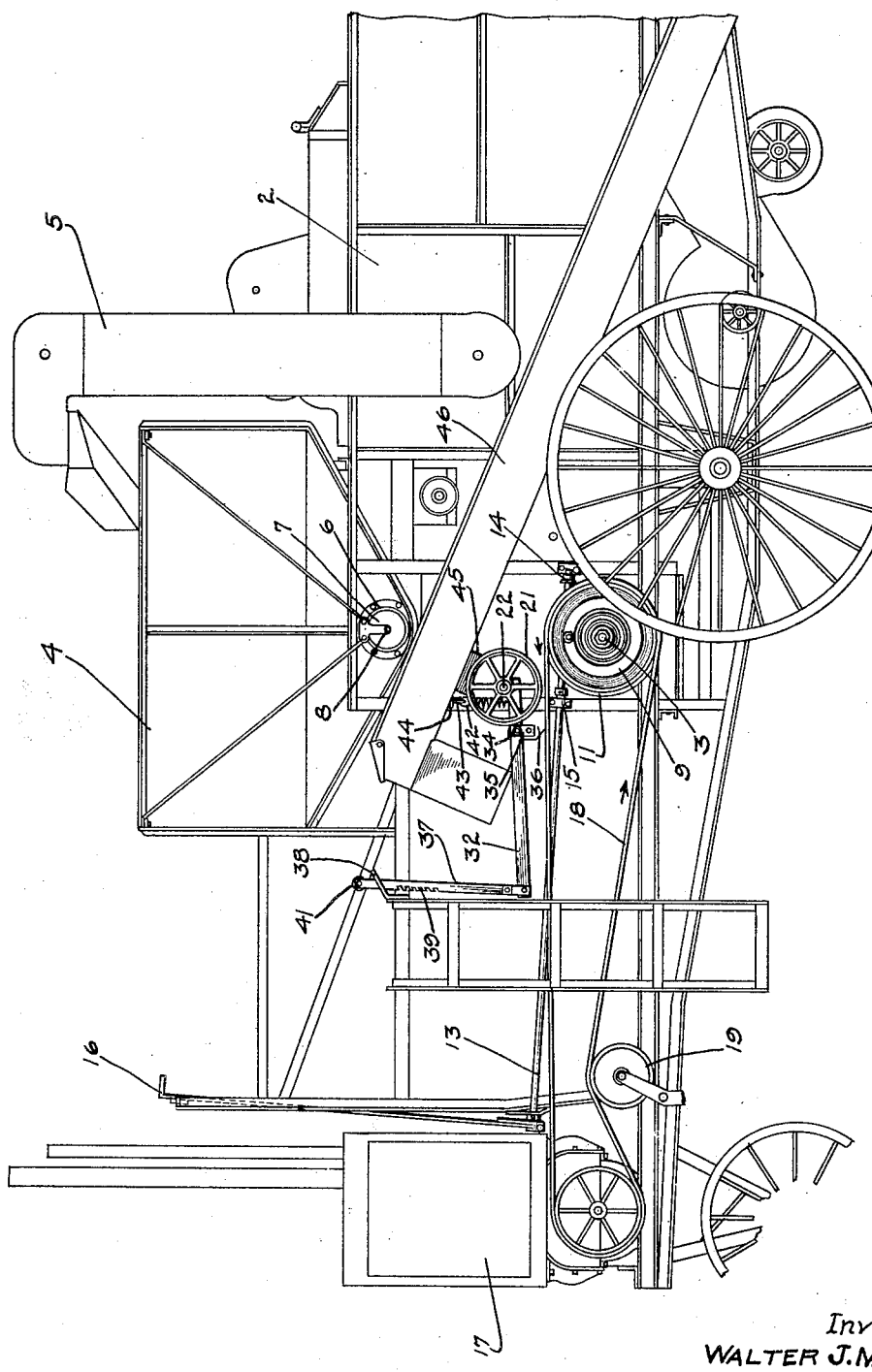

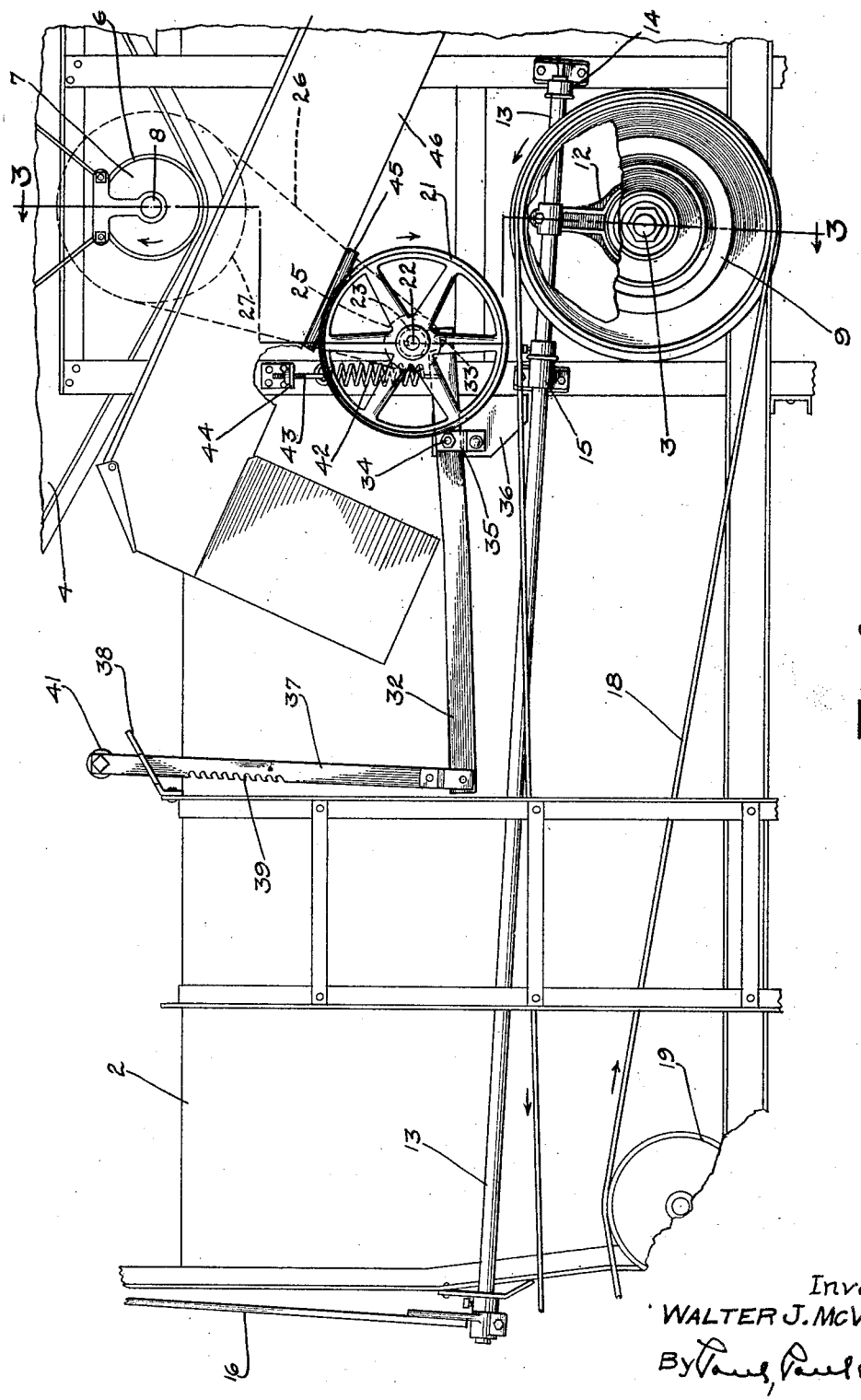

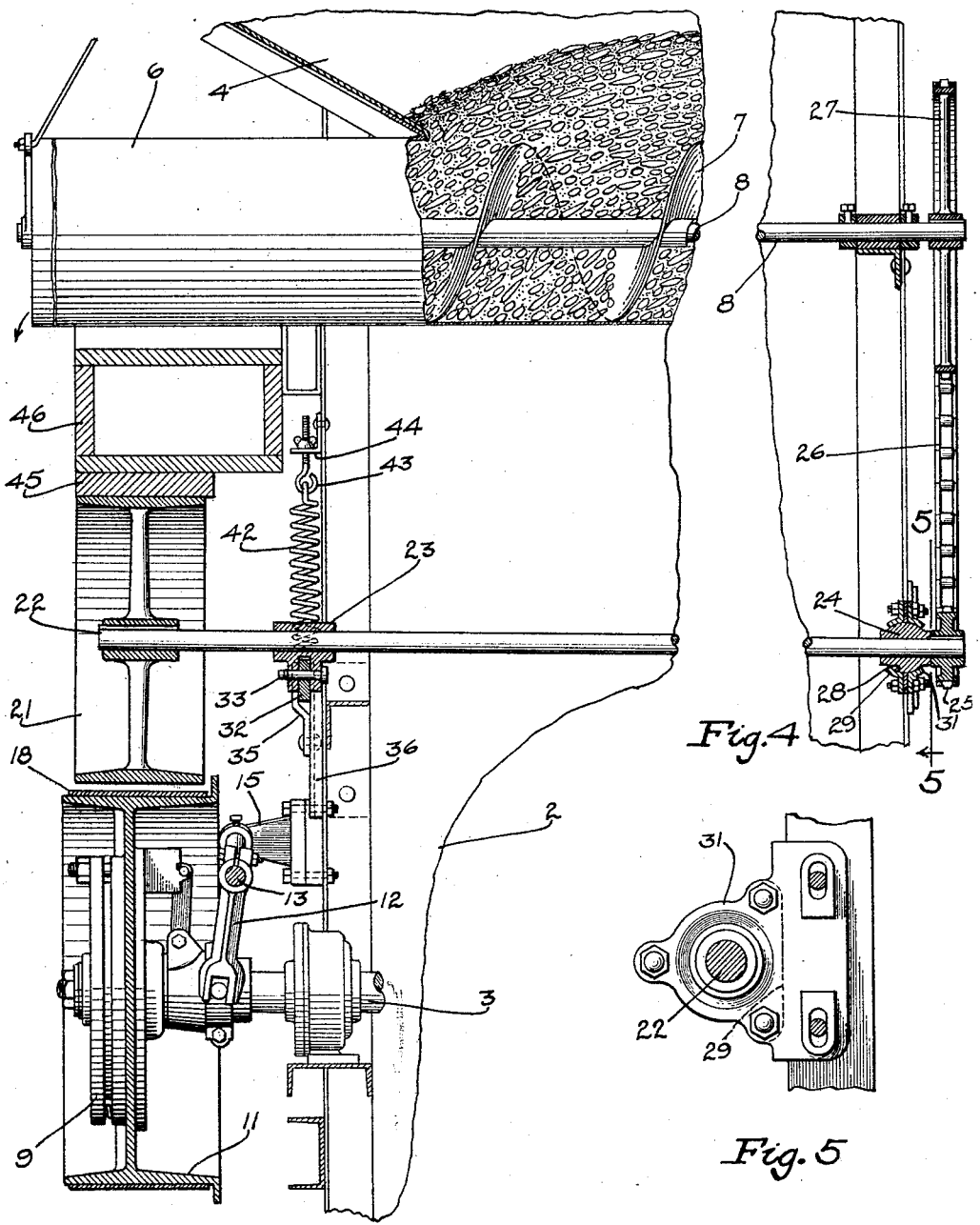

1,869,072

UNITED STATES PATENT OFFICE

WALTER J. McVICKER, OF MINNEAPOLIS, MINNESOTA, ASSIGNOR, BY MESNE ASSIGNMENTS, TO MINNEAPOLIS-MOLINE POWER IMPLEMENT COMPANY, A CORPORATION OF DELAWARE

THRESHING APPARATUS

Application filed February 20, 1928. Serial No. 255,708.

This invention relates to new and useful improvements in threshing apparatus and more particularly relates to such apparatus of the type commonly known as "harvester-threshers" adapted for harvesting and threshing grain at the same time.

An apparatus of the above mentioned character usually comprises a harvester and a grain separator, combined in one unit. The apparatus may be provided with its own power-propelling means, or it may be propelled by a separate unit, such for example, as a tractor. The grain is delivered from the harvester into the thresher where the grain is separated from the straw in the usual manner, and delivered into a grain storage tank, usually provided on top of the separator. This tank has a spout for discharging the grain therefrom into wagons or other suitable receiving means, positioned adjacent to the separator. An auger is provided in the grain discharge spout and usually is operated either directly from the cylinder shaft, or from some other driven shaft of the separator. When the auger is thus operated, it can only be made to function when the separator is functioning. I have found that it is very desirable that the auger be provided with an independent drive so that it may be operated to discharge grain from the tank wholly independently of the operation of the separator.

An object of the present invention is to provide an independent drive for the grain discharge auger, whereby it may be operated independently of the separator or simultaneously therewith, as desired. Preferably, the driving means for the auger is operable by frictional contact with the drive belt usually connecting the cylinder shaft with the power means. A clutch pulley is loosely mounted upon the cylinder shaft whereby said shaft may be operated or not, as desired, when the pulley is being rotated by its belt connection with the engine. In the drawings, I have shown the drive for the grain discharge auger as comprising a counter shaft having a pulley mounted thereon and adapted to have its periphery moved into and out of frictional driving engagement with the cylinder drive belt, whereby the operation of the auger may be controlled independently of the separator.

A further object of the invention is to provide a clutch on the cylinder shaft whereby the operation of the separator may be controlled without interrupting the engine or the cylinder drive belt.

The particular object of the invention therefore, is to embody in the construction of the separator, means permitting independent operation of the grain discharge auger and also means for controlling the operation of the separator without interrupting the engine or cylinder shaft drive belt.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the accompanying drawings forming part of this specification;

Figure 1 is a side elevation of a portion of a separator showing the invention applied thereto;

Figure 2 is an enlarged detailed view illustrating the driving means for the grain discharge auger;

Figure 3 is a vertical sectional view on the line 3—3 of Figure 2, showing the auger drive pulley out of engagement with the cylinder drive belt;

Figure 4 is a detailed sectional view illustrating the driving connection between the counter shaft and the auger shaft; and Figure 5 is an enlarged detailed sectional view on the line 5—5 of Figure 4.

In the selected embodiment of the invention here shown, for purposes of disclosure, there is illustrated in Figure 1, a portion of a separator 2, of conventional form, having the usual cylinder shaft 3, grain storage tank 4, elevator 5, grain discharge spout 6, auger 7, and the auger drive shaft 8, best shown in Figures 3 and 4.

To control the operation of the separator without interrupting the engine or the drive belt connecting the engine with the cylinder shaft of the separator, the cylinder shaft 3 is provided with a suitable clutch 9 associated with a suitable pulley 11. The pulley 11 is adapted to idle with respect to the cylinder shaft 3, when the clutch 9 is in inoperative position. The clutch is adapted to be moved into and out of driving engagement with the pulley 11 by means of a forked arm 12 secured to a shaft 13, supported in bearings 14 and 15 mounted on the walls of the separator. (See Figure 2.) An operating handle 16 is terminally secured to the forward end of the shaft 13 for the convenient operation of the clutch 9. In this instance, the pulley 11 is driven from the engine 17, mounted at the forward end of the separator and having a drive belt 18 connecting it with the pulley 11, as particularly shown in Figure 1. Slack in the belt 18 is taken up by the idler 19, which may be of any suitable construction.

A feature of this invention resides in the provision of an independently operable driving means for transmitting power to the shaft 8 of the grain discharge auger 7. Such a mechanism is shown in the drawings, (Figures 3 and 4), and the form here shown comprises a pulley 21 secured to one end of a counter shaft 22, mounted in bearings 23 and 24. A sprocket 25 is terminally secured to the opposite end of the shaft 22, and has a chain 26 connecting it with a comparatively larger sprocket 27, secured to one end of the shaft 8. The bearing 24 is preferably provided with a spherical surface 28 retained between members 29 and 31, secured to the side wall of the separator. By thus supporting the bearing 24, the opposite end of the shaft 22 may be vertically oscillated, as will be subsequently described.

The bearing 23, supporting the opposite end of the shaft 22, is pivotally connected to one end of a bar 32 by a suitable pivot pin 33. The bar 32 is pivoted to the wall of the separator by means of a bolt 34 and brackets 35 and 36. An operating member 37 is pivotally connected with the opposite end of the bar 32 and has its upper end guidingly supported in a guide 38, suitably secured to the separator frame. A series of spaced teeth 39 are provided in one edge of the bar 37. These teeth are adapted to engage the guide 38 to retain the horizontal bar 32 in its adjusted positions. A hand grip 41 is shown at the upper end of the member 37 for conveniently operating it.

A tension spring 42 has one end connected with the horizontal bar 32 adjacent to the bearing 23, and has its other end connected with an I-bolt or hook 43, adjustably mounted in a bracket 44 secured to the separator wall. This spring constantly urges the pulley 21 upwardly. A friction shoe 45 is secured to the elevator 46 and is adapted to be frictionally engaged by the periphery of the pulley 21, to interrupt rotation of the latter, when moved to its inoperative position, shown in Figure 2. As a result of the ball-and-socket support for the opposite end of the counter shaft 22, the pulley 21 may be moved into and out of frictional engagement with the belt 18 by movement of the vertical bar 37.

By the employment of the novel means above described for operating the auger 7, it will readily be seen that the auger may be operated independently of the cylinder shaft 3, to discharge grain from the storage tank 4. The clutch 9 also permits the functioning of the separator to be interrupted while the auger 7 is being operated to discharge grain from the tank. Heretofore, it has been necessary to operate the entire separator mechanism whenever grain was being discharged from the storage tank 4, because of the direct driving connection between the separator operating mechanism and the discharge auger. Also, by thus independently operating the grain discharge auger 7, the discharging of grain from the storage tank 4 may be controlled at will, during traveling movement of the separator or when the latter is at rest. Also, by means of the clutch 9, the functioning of the separator may be controlled without interrupting the engine. Operation of the auger drive shaft 8 is conveniently effected by the simple manipulation of the hand grip 41, to cause grain to be discharged from the spout 6. This novel drive also permits the auger to be operated to discharge grain from the storage tank while the separator is inoperative, thereby allowing the separator attendant to make repairs upon the separator while grain is being discharged from the storage tank.

I claim as my invention:

1. In combination, a shaft, bearings supporting said shaft, one of said bearings being mounted for pivotal movement and the other for swinging movement, means to be driven operatively connected with said shaft adjacent to said pivotally mounted bearing, a pulley secured to the swingable end portion of the shaft, a driving member, a lever connected with said swingable bearing whereby said shaft may be operated to move said pulley into driving engagement with said driving member, and resilient means constantly acting on said shaft to move said pulley out of driving engagement with said driving member.

2. In combination, a shaft, bearings supporting said shaft, one of said bearings being mounted for universal movement and the other for swinging movement, means to be driven operatively connected with said shaft adjacent to said pivotally mounted bearing, a pulley secured to the swingable end portion of the shaft, a drive belt, a pivoted lever having one end connected with said swingable bearing whereby said shaft may be operated to move said pulley into driving engagement with said drive belt, a suitable brake, a spring constantly urging said shaft in a direction to move said pulley out of engagement with said drive belt and into engagement with said brake to stop rotation of the shaft, and means for securing said lever in adjusted position.

3. In combination, a shaft, bearings supporting said shaft, one of said bearings being mounted for universal movement and the other for swinging movement, means to be driven operatively connected with said shaft adjacent to said pivotally mounted bearing, a pulley secured to the swingable end portion of the shaft, a drive belt, a pivoted lever having one end pivotally connected with said swingable bearing whereby said shaft may be operated to move said pulley into driving engagement with said drive belt, a suitable brake shoe, a spring constantly urging said shaft in a direction to move said pulley out of engagement with said drive belt and into engagement with said brake shoe to stop rotation of the shaft, and a rack bar connected with said lever and cooperating with a fixed member to secure the lever in adjusted position.

In witness whereof, I have hereunto set my hand this 16th day of February 1928.

WALTER J. McVICKER.